United States Patent
Gourand

(10) Patent No.: US 6,688,836 B2
(45) Date of Patent: Feb. 10, 2004

(54) SELF-PROPELLED DOLLY WITH POWER LIFT

(76) Inventor: Chris M. Gourand, P.O. Box 1573, Clarkston, MI (US) 48347

( * ) Notice: Subject to any disclaimer, the term of this patent is extended or adjusted under 35 U.S.C. 154(b) by 41 days.

(21) Appl. No.: 10/222,418

(22) Filed: Aug. 16, 2002

(65) Prior Publication Data

US 2003/0039535 A1 Feb. 27, 2003

Related U.S. Application Data

(60) Provisional application No. 60/327,341, filed on Oct. 5, 2001, and provisional application No. 60/313,887, filed on Aug. 21, 2001.

(51) Int. Cl.⁷ .................................................. B60P 1/00
(52) U.S. Cl. ....................................... 414/543; 414/541
(58) Field of Search ................................ 414/540, 541, 414/543, 909

(56) References Cited

U.S. PATENT DOCUMENTS

| | | |
|---|---|---|
| 901,532 A | 10/1908 | Gillum |
| 1,448,814 A * | 3/1923 | Norris .......................... 414/543 |
| 1,732,153 A | 10/1929 | Crichton |
| 2,663,440 A | 12/1953 | Jackson |
| 2,740,484 A | 4/1956 | Montana |
| 3,205,963 A | 9/1965 | Tinker |
| 3,698,501 A | 10/1972 | Gross |
| 3,713,501 A | 1/1973 | Hurt |
| 3,735,831 A | 5/1973 | Gray |
| 3,788,413 A | 1/1974 | Miller |
| 4,130,210 A | 12/1978 | Purviance |
| 4,266,903 A | 5/1981 | Surbrook |
| 4,460,306 A | 7/1984 | Hawkins |
| 4,629,391 A | 12/1986 | Soyk et al. |
| 4,648,778 A | 3/1987 | Schultz |
| 4,729,711 A | 3/1988 | Holopainen |
| 5,139,102 A | 8/1992 | Pocapalia |
| 5,343,969 A | 9/1994 | Taylor |
| 5,547,035 A | 8/1996 | Berry |
| 5,577,568 A | 11/1996 | Scott |
| 5,580,073 A | 12/1996 | Irwin et al. |
| 5,800,117 A * | 9/1998 | Milton ........................ 414/540 |
| 5,975,826 A | 11/1999 | Scholder |
| 5,993,136 A * | 11/1999 | Vickary ....................... 414/543 |

OTHER PUBLICATIONS

Tiiger–I Mini–Derrick The Machine for the New Millennium Brochure.

Tiiger Material Handling Make Utility Work Safe and Easy Brochure.

Utility Products Showcase Thiermann Power Dollies Being Restored Brochure.

* cited by examiner

*Primary Examiner*—James R. Bidwell
(74) *Attorney, Agent, or Firm*—Reising, Ethington, Barnes, Kisselle, P.C.

(57) ABSTRACT

A power dolly is disclosed having an elongated main frame and load bed with a pair of traction wheels at the front end and a pivot wheel at the rear end with a manual steering handle behind the pivot wheel. The load bed is supported on the dolly frame in an inclined position with the bed sloped downwardly from the rear end to the front end. A crane with a mast and boom is mounted at the front of the dolly. The boom is angularly adjustable through 180 degrees rearwardly of the mast.

20 Claims, 8 Drawing Sheets

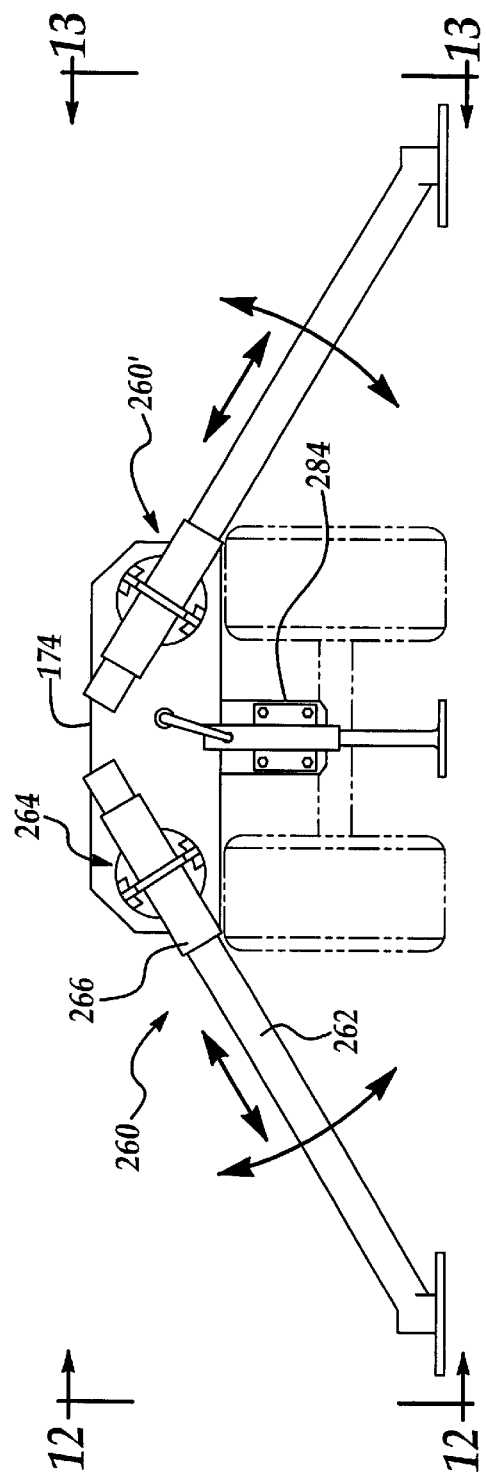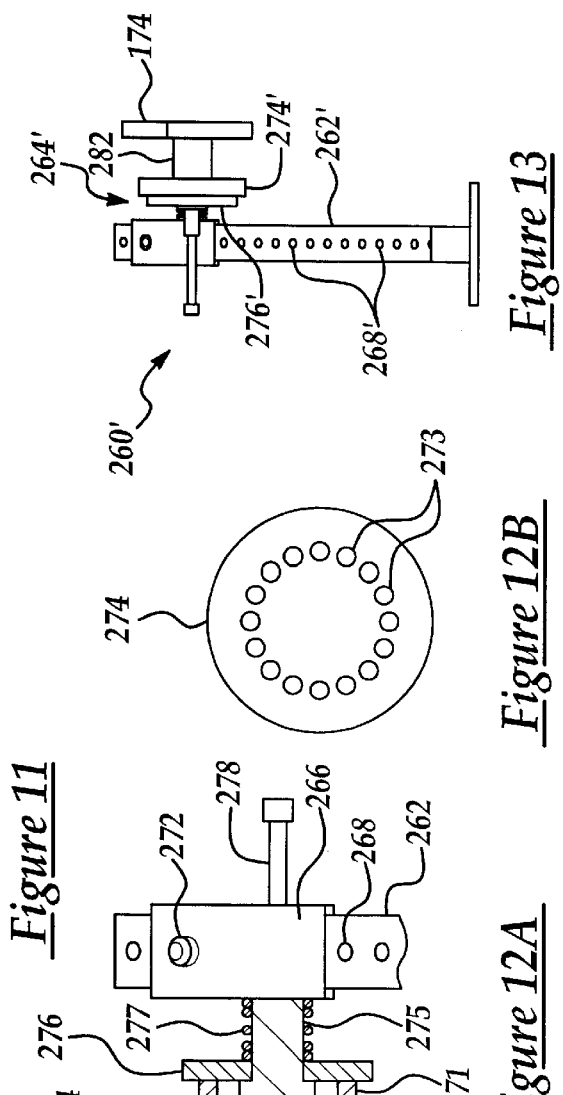
Figure 11
Figure 12
Figure 12A
Figure 12B
Figure 13

SELF-PROPELLED DOLLY WITH POWER LIFT

CROSS REFERENCE TO RELATED APPLICATIONS

This application claims priority from Provisional Application No. 60/313,887, filed Aug. 21, 2001 and Provisional Application No. 60/327,341, filed Oct. 5, 2001.

FIELD OF THE INVENTION

This invention relates to dollies for transporting heavy objects and more particularly it relates to a self-propelled dolly adapted for one-person operation for lifting and transporting heavy loads.

BACKGROUND OF THE INVENTION

In various commercial and industrial applications there is a need for a work vehicle which is especially adapted for operation by a single person to lift, transport and deposit heavy objects of various shapes, forms and weights. A prime example is the landscaping industry for both residential and commercial properties where the job may entail removal or rearrangement of existing landscape features and/or installation of new landscape features. Such work, for example, may include transporting heavy logs, large rocks, gravel and other such objects. For the landscape company, large or small, such tasks could be performed more efficiently and with greater safety for personnel by having a work vehicle which requires only one person to perform such tasks. Such a vehicle must be adapted to operate in a loading and unloading mode for lifting and depositing a wide variety of objects for loading and unloading the vehicle. Further, such work vehicle must be adapted to operate in a transport mode for moving a load of objects from one location to another. For both modes of operation, the work vehicle must be of such size and shape so that it can move forward or backward through narrow passageways. It must also be able to traverse rough, uneven and steep terrain without undue risk of tipping over or losing its load. Additionally, such vehicles should have stair climbing ability in a loaded condition. Further, the vehicle should provide power lifting and depositing of objects and transporting such objects at such speeds that would be as fast or faster than can be done by manual lifting and moving of such objects. It is believed that the work vehicle which would meet these performance characteristics is not available or known in the present state of the art.

An object of this invention is to provide a work vehicle which can perform tasks such as described above under the operation of a single person. Another object is to overcome other disadvantages of the prior art.

SUMMARY OF THE INVENTION

In accordance with this invention, a work vehicle in the form of a dolly is self-propelled and provided with a power lift for loading and unloading heavy objects for transport by the dolly under the control of a single person. More particularly, the dolly is provided with a pair of traction wheels which are driven by a power train including an engine and transmission. The dolly is also provided with a caster wheel which shares the load with the traction wheels and facilitates manual steering of the vehicle by the operator. The traction wheels are located under the front end of the load bed and the steering handle for manual steering is located at the rear end with the caster wheel located at an intermediate position. Further, the dolly comprises a load bed supported on the dolly frame in an inclined position with the bed sloped downwardly from the rear end to front end. The power lift of the dolly is located at the front of the vehicle and comprises a vertical mast, suitably adjustable in height, with a boom and power winch mounted on the mast. The boom is angularly adjustable relative to the longitudinal axis of the mast and can be manually swung through a one hundred eighty degree angle about the axis of the mast and rearwardly of the mast.

A complete understanding of the invention may be obtained from the detailed description that follows taken with the accompanying drawings.

DESCRIPTION OF THE DRAWINGS

FIGS. 11, 12, 12A, 12B and 13 show a modified front outrigger arrangement.

BEST MODE FOR CARRYING OUT THE INVENTION

Figure 1:
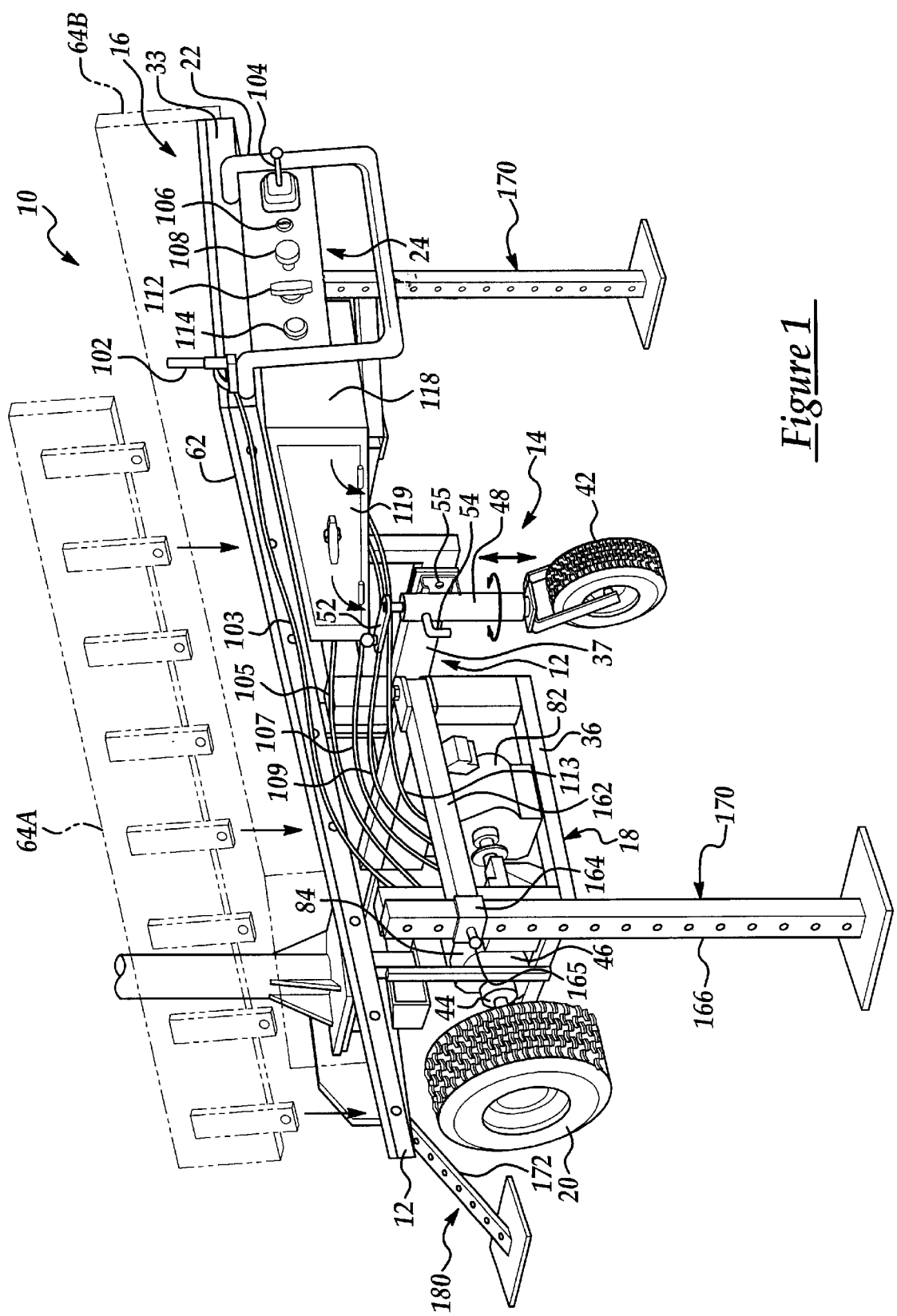
FIG. 1 is a perspective view of the dolly of this invention in a parked position.

Referring now to the drawings, there is shown an illustrative embodiment of the invention in a self-propelled dolly with a power lift adapted for one-person operation for lifting and transporting heavy objects. The dolly is a walking-dolly, i.e. the one-person operator walks behind the dolly at a control panel and manually maneuvers its direction of movement. It will be appreciated as the description proceeds that the dolly may be implemented in a variety of embodiments and may be utilized in a wide variety of applications.

A preferred embodiment of the invention will now be described. The dolly 10 of this invention comprises a frame 12 which is supported on an undercarriage 14 and supports a load bed 16 for holding objects to be transported on the dolly. The dolly also comprises a power train 18 which drives traction wheels 20 of the undercarriage 14. The caster wheel 42 shares the load with the traction wheels 20 and also facilitates manual steering. A steering handle 22 and control panel 24 are provided at the rear of the dolly for manipulation by the dolly operator when the dolly is operating in its transport mode.

Figure 2:
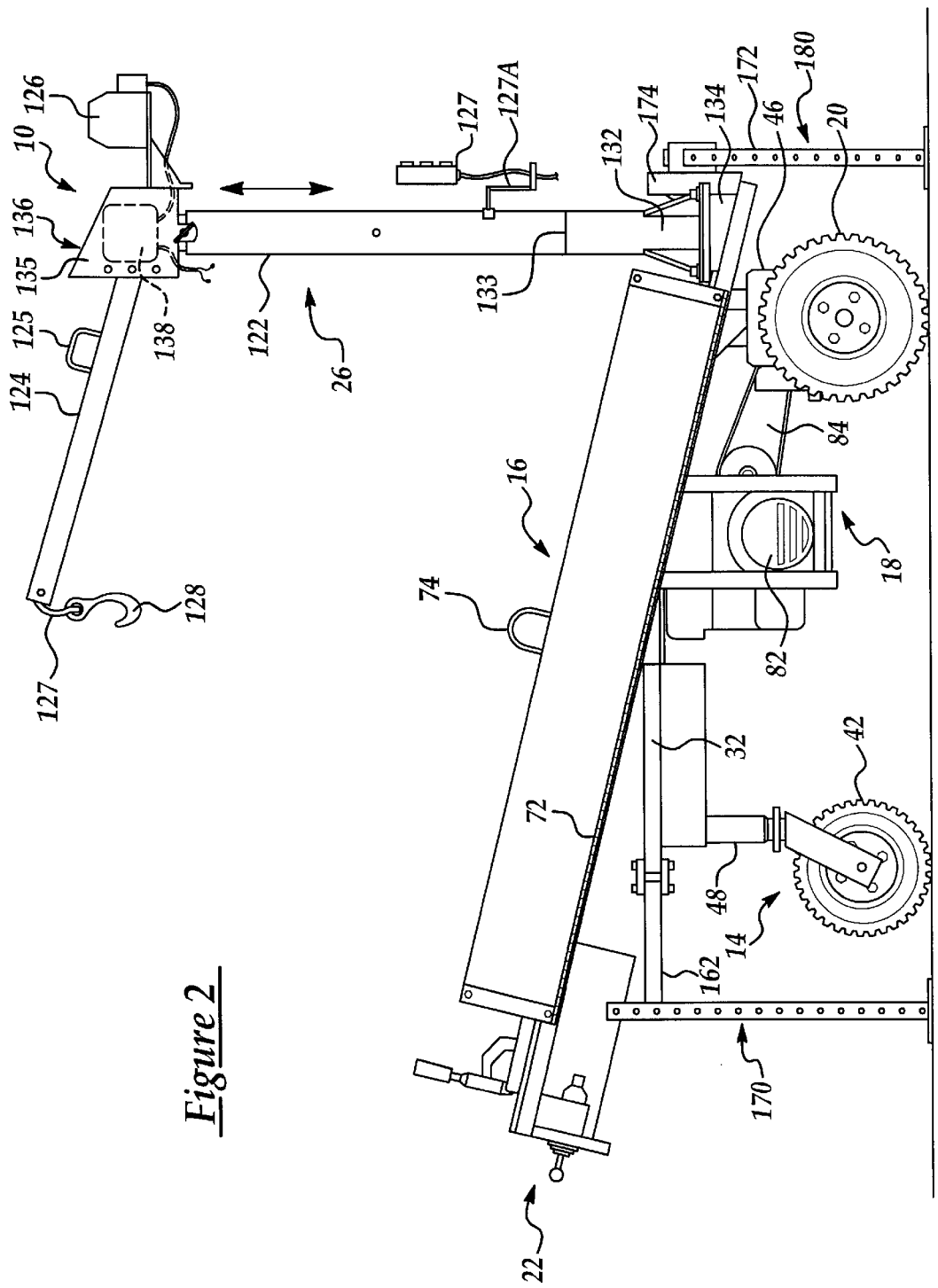
FIG. 2 is a side elevation view of the dolly in the parked position of FIG. 1.
Figure 5:
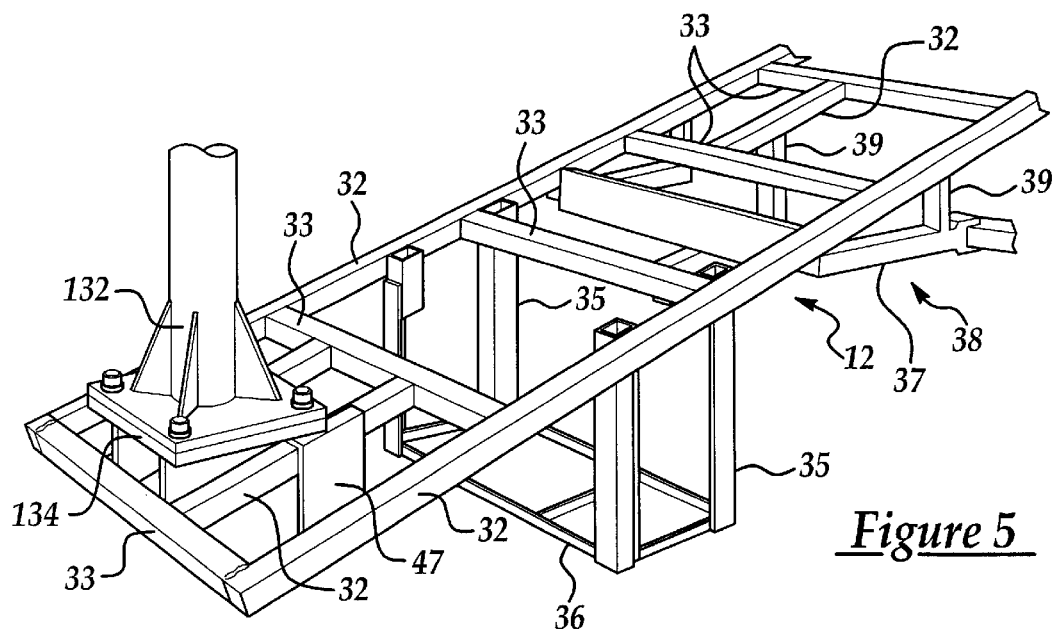
FIG. 5 is a perspective of the frame of the dolly.
Figure 3:
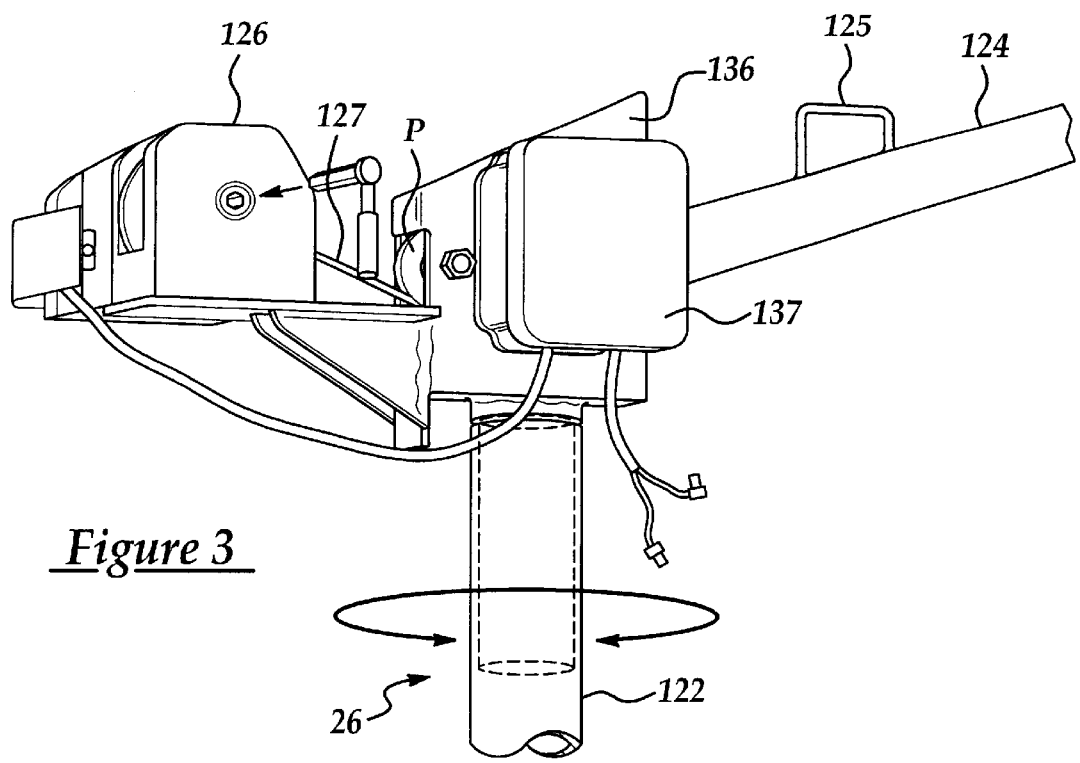
FIG. 3 shows the power lift of the dolly.
Figure 4:
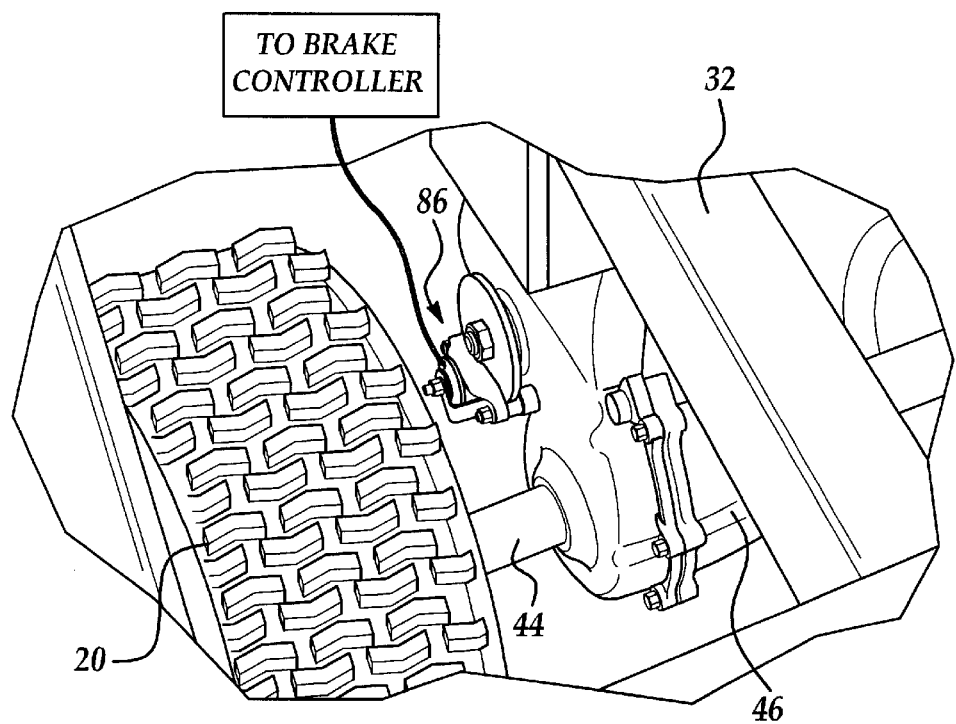
FIG. 4 is a fragmentary view of the hydraulic transmission housing and brake mechanism.

The main frame 12 of the dolly, best shown in FIG. 5, comprises a set of longitudinal beams 32 which extend fore-and-aft of the dolly and a set of cross beams 34 for supporting the load bed 16. As shown in FIGS. 1 and 2, the main frame 12 is supported on the undercarriage 14 in an inclined attitude relative to the plane of support defined by the three wheels, resting on a horizontal roadway. The incline or tilt of the load bed 16 is suitably about twenty degrees. The frame also includes a platform frame 36 for supporting the engine 82. The platform frame 36 is supported on the main frame so that it is approximately parallel to the plane defined by the three wheels of the dolly. A sub-frame 38 supports the caster wheel 42 and the rear outriggers 170 (to be described below). The sub-frame 38 is rectangular and comprises a set of peripheral beams 37 which are supported on the main frame by welding and by the vertical struts 39. The frame 38 is mounted so that it is in a plane parallel to that of the platform frame 36.

The undercarriage 14 comprises the traction wheels 20 and a caster or pivot wheel 42. The traction wheels 20 are mounted on and driven by an axle 44 of a hydraulic transmission 46 in the power train 18. The caster wheel 42 is supported on a longitudinal beam 37 of the sub-frame 38 by a vertical strut 48 for pivotal motion, relative to the strut, around the axis of the strut to facilitate steering of the dolly by manual movement of the steering handle 22 transversely of the longitudinal axis of the dolly. The vertical strut 48 is provided with an adjustment crank 52 for setting the length of the strut. The strut 48 is mounted on the beam 37 by a horizontal pivot shaft (not shown) and is thereby pivotable in vertical plane through the strut. A locking pin or pull-pin 54 mounted on the strut 48 is engaged with a hole in the sub-frame member 37 to lock the strut in a selected fore-and-aft position. The beam 37 is provided with additional holes such as hole 55 so that the strut may be rotated in the fore-and-aft direction and locked in a desired angular position by the pull-pin. The adjustment of the length of the strut 48 and the adjustment of the angular position is provided to accommodate stair climbing operation of the dolly by setting the strut so that the caster wheel and the pair of traction wheels are supported by different treads of the stairway at the same time.

The load bed 16, as shown in FIG. 1, comprises a flat rectangular deck 60 of relatively narrow width extending longitudinally of the dolly. It is inclined relative to plane defined by the support plane of the wheels as described above. The load bed 16 also includes a pair of sideboards 64A and 64B mounted on opposite edges of the flat deck 62. The deck 60 comprises a deck plate 62 secured to the main frame 12 and preferably comprises a piece of heavy gauge sheet steel. As shown in FIG. 1, each of the side boards 64A and 64B is removably mounted on the longitudinal beams 32 of the main frame by a plurality of posts with pin connections.

A modification of the load bed 16 is shown in FIG. 2. In this modification, the deck plate 62 is pivotally connected by a hinge 72 welded to the upper edge of the longitudinal beam 32 of the main frame so that the opposite edge of the deck plate may be lifted for dumping loaded objects resting on the load bed. In this operation, the side board 64B' is secured to the deck plate opposite the hinge and a lifting eye 74 is attached to the sideboard. In this modification, a removable sideboard may be used on the hinge side of the load bed and may be a sideboard such as 64A in FIG. 1. In this modification, the deck plate may be provided with a transverse profile such that a load of material, say loose gravel, will be completely dumped when the deck is lifted to the dumping position. The desired profile for the deck plate 72 may be provided, for example, by adding a heavy gauge pre-formed sheet of heavy gauge steel onto the upper surface of the deck plate 72. The lifting of the hinged deck plate 72 for dumping is performed by the power winch 126 and the lift hook 128 which will be described below. Each sideboard 64 is provided with a lifting eye 74 for removal from the deck.

The power train 18 comprises an internal combustion engine 82 and a reversible hydraulic transmission 46. The engine 82 is mounted on the platform frame 36 and its output shaft drives the input shaft of the transmission 46 through a belt drive 84. The transmission 46 is mounted on a support plate 47 (see FIG. 5) and has an output shaft extending transversely of the main frame 12 at both ends of the transmission casing. The traction wheels 20 are mounted on and drivingly connected with the opposite ends of the drive shaft. The hydraulic transmission has a controller 104 on the control panel 24 and provides for operator selection of forward, neutral and reverse output drives of the transmission. A disk brake 86 is provided on the output shaft of the hydraulic shaft transmission 46 and is actuated by a brake controller 102 on the steering handle 22 adjacent the control panel 24.

The traction wheels 20 are provided with pneumatic tires having a coarse knobby tread suitable for rough terrain and having a gripping capability adapted for stair climbing. The caster wheel 42 is also provided with a pneumatic tire having a coarse tread. The caster wheel is preferably of smaller diameter than the traction wheels.

The steering handle 22 and the control panel 24 give the dolly operator control of the direction and speed of the dolly in its transport mode of operation. The brake lever 102 actuates the disk brake 86 through a push-pull cable 103. The steering handle 22 is mounted to the frame 12 of the dolly and enables the operator to steer the dolly by grasping the handle and forcing it to the left or right to initiate turning of the dolly. The control panel 24 includes a transmission control lever 104 which is actuable by the dolly operator to shift the hydraulic transmission 46 from neutral to either forward or reverse drive. The transmission control lever 106 is connected through a push-pull cable 105 with a shifter lever on the transmission. The control panel also includes an ignition/start key switch 106 for electric starting of the engine 82. The ignition switch is connected through a wire in an electric cable 107 with the engine starter. An engine kill switch 108 is provided on the control panel and is connected with the engine ignition circuit through another wire in the electric cable 107. The control panel has an engine throttle handle 112 which is connected with the engine carburetor through the push-pull cable 109. The control panel also includes a choke control 114 which is connected through a cable 117 to the carburetor of the engine.

The work lift or crane 26 is mounted on the front end of the dolly and is adapted for handling heavy objects with the dolly in the lift mode of operation. The crane 26, as shown in FIG. 2, comprises, in general, a mast 122 which supports an adjustable boom 124 and a power winch 126. The mast 122 has a mast base 132 which is mounted on a mast platform 134 in fixed position relative to the plane defined by the ground engaging points of the three wheels of the dolly. The mast 122 has a lower end of reduced diameter (not shown) to make a telescopic joint with the mast base 132, as indicated by the line 133.

A rotatable mast head 136 is mounted in the top of the mast 122 and comprises an enclosure 135 made of steel plates and which is a rectangular box with a sloping roof and an open side through which the boom projects. The mast head 136 is mounted on a cylindrical stub shaft 138 which mates with the open upper end of the mast 122. The electric power winch 126 is mounted on a shelf welded to the mast head 136. The winch 126 is energized by a battery (not shown) which is mounted on the platform frame 36 adjacent the engine. A junction box 137 is mounted on the mast head 136 and is connected with the battery through a cable for voltage supply to the winch 126 through the indicated cable connection. A hand-held remote control 127 for control of the electric winch 126 is connected by an electric cable through the junction box 137 to the winch 126. The remote control includes three push buttons for switching the winch between the lift, lower and off operations. A holder 127A for the remote control unit is attached to the mast 122. The winch cable 129 extends from the winch take-up drum (not shown) over a pulley 129' in the enclosure 135 and out the boom 124 to a pulley (not shown) and a hook 128 for connection with objects to be lifted by the winch. A boom handle 125 is mounted on the boom for use by the operator in rotatively positioning the boom by rotation of the mast head. The winch 126 is provided with a manual flip switch 131 which disengages the winch drive train and allows the cable drum to free-wheel. This feature is useful to speed up the paying-out by hand of the cable for connection of the hook 128 to an object to be lifted. The boom 124 is pivotally mounted to the mast head in the enclosure 135 so that it can be adjusted to selected angles in the vertical plane. For adjustment purposes, a pull pin (not shown) is provided on the enclosure which locks the boom in one of three different angular positions as indicated in FIG. 2.

Figure 2A:
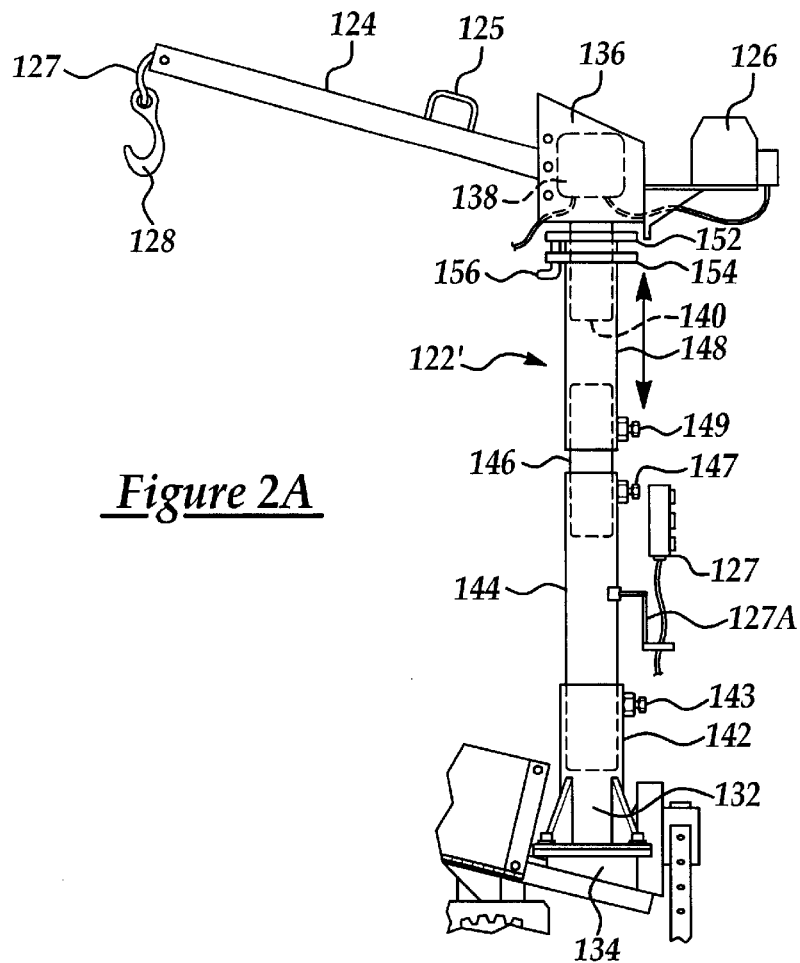
FIG. 2A shows a modification of the mast of the dolly.

A modified mast 122' is shown in FIG. 2A. The mast 122' is adjustable in height by a telescopic arrangement. Further, a limit stop is provided between the mast 122A and the mast head 136 to limit the rotation of the boom. For height adjustment, the mast 122' is split into a lower section 144 and an upper section 148. The lower section 144 is telescopically connected with a socket 142 of the mast base 132. A set screw 143 holds the mast section 144 at the selected height position. The upper section 148 is connected with the lower section 144 by a telescopic fitting 146 which is held in a desired height adjustment by set screws 149 and 147, respectively.

The modified mast structure 122' includes a collar 154 which is welded to the upper end of the upper mast section 148. The collar 154 carries a spring loaded pull pin 156 which serves as a limit stop for limiting the rotational angle of the boom relative to the fore-and-aft direction of the dolly. For this purpose, the stub shaft 140 has an annular collar 152 welded to it at a location just above the annular collar 154. The collar 152 has three limit stop abutments as follows: a first abutment (a hole) on collar 152 is in alignment with the pull pin 156 when the boom 124 is centered over the load bed of the dolly. When the pull pin 156 is pulled out of the hole on collar 152 the boom 124 is free to rotate one hundred eighty degrees in one direction until the stop pin 156 hits a second abutment on the periphery of the collar 152; likewise, when the pin is pulled the boom is free to rotate ninety degrees in the other direction until the pin 156 hits a third abutment on the periphery of the collar 152. Thus, the boom is confined to positions in an arc of one hundred eighty degrees ranging from one side of the front end of the dolly to the other side of the front end of the dolly. Thus, the boom is prevented from reaching forward of the dolly to pick up a load because that would destabilize the dolly.

In order to provide stability for the dolly in its lift mode, a set of outriggers are provided on the dolly. A pair of rear outriggers 170 are provided at the rear of the dolly. The left rear outrigger includes an outrigger arm 162 pivotally mounted to the frame 12 and provided with a rectangular clamp sleeve 164 welded to its outer end. An outrigger post or leg 166 is mounted on a foot plate and inserted through the clamp sleeve 164 to a desired position. The post 166 is locked in position by a pull pin 165. The right rear outrigger 170 is of the same construction as the left rear outrigger just described. The dolly is also provided with left front and right front outriggers 180. Each of the front outriggers comprises a post 172 which is pivotally mounted to a support plate 174 on the front end of the frame 12. Also, each of the posts 172 is provided with a foot plate which is pivotally mounted to the lower end of the post. The outriggers are deployed, as needed, when the dolly is operated in the lift mode.

In the exemplary embodiment of the dolly described above, the engine 82 is a nine horsepower, four stroke-cycle, gasoline engine manufactured by Briggs Corporation under the model name VanGuard. The hydraulic transmission is manufactured by the Peerless Corporation. The electric winch 126 is SuperWinch Model 350 available from Ergomatic Systems, Inc. of Davisburg, Mich. The load bed of the dolly is nine feet long and approximately thirty-six inches wide. The traction wheels 20 have a tire tread which is approximately twenty-two inches in diameter and the caster wheel 42 has a tire diameter of approximately sixteen inches diameter. The crane 26 is capable of lifting and handling a load of one thousand pounds.

A modification of the dolly will now be described with reference to FIGS. 6, 7 and 8. In this modification, the dolly is provided with a hydraulic winch in place of the electric winch previously described. Further, in this modification a hydraulic control system comprises hydraulic power actuators for operation of the dolly in the loading and unloading modes. The hydraulic control system, in general, comprises a hydraulic pump 182 which is driven by the engine 82 through a direct shaft coupling and which is mounted on the platform 36 adjacent the engine output shaft. A hydraulic fluid reservoir (not shown) is located adjacent the pump. The hydraulic winch 126' and a set of reversible hydraulic actuators, described below, are energized by the hydraulic pump through a set of manually actuated control valves 184 which are mounted adjacent the control panel 22.

Figure 6:
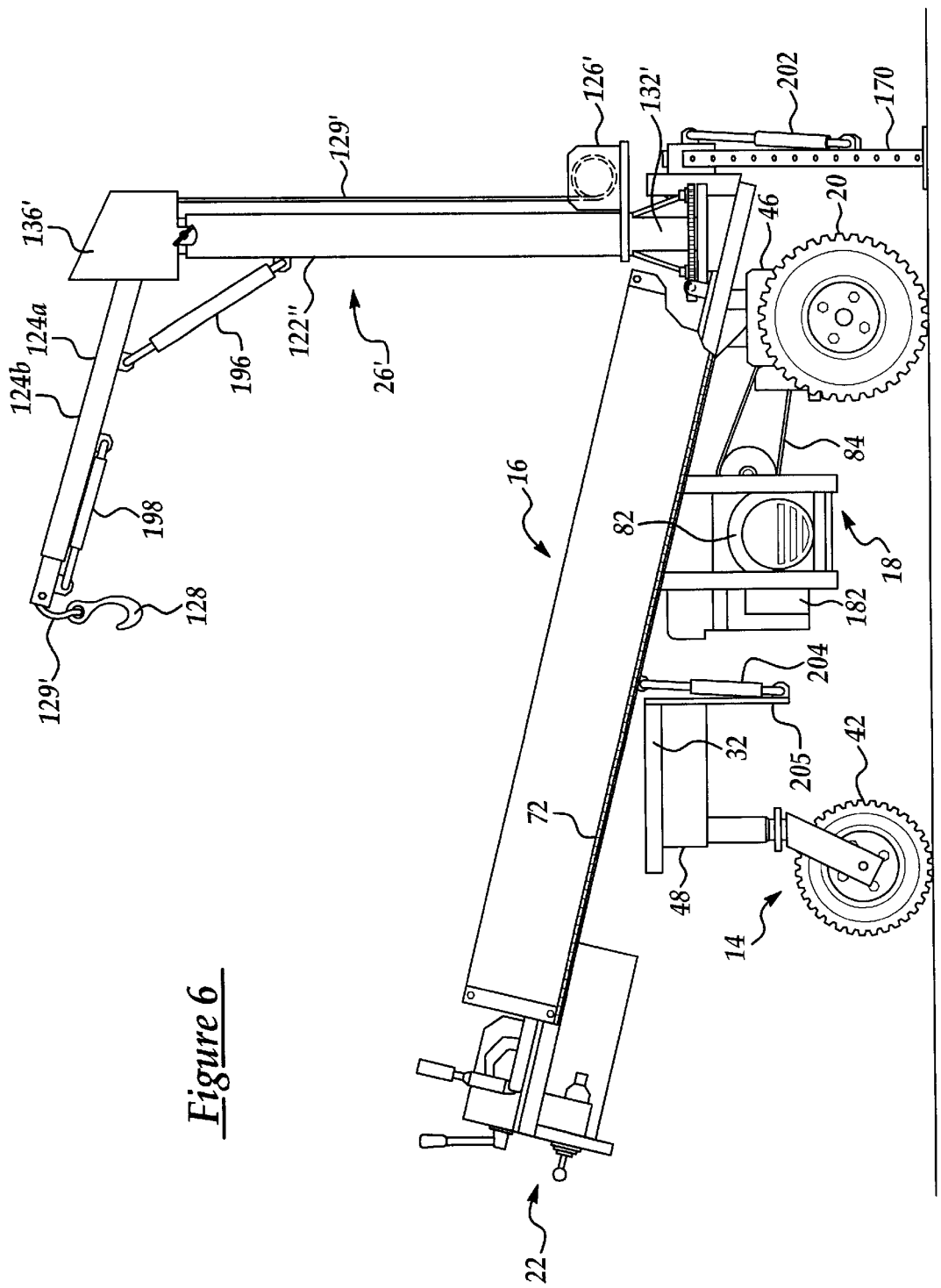
FIG. 6 shows a modification of the dolly in which the dolly is provided with hydraulic actuators.

As shown in FIG. 6, the crane 26' comprises, in general, a mast 122" which supports an adjustable boom 124'. The hydraulic power winch 126' is mounted on the lower portion of the mast by a support bracket. The mast 122" has a rotatable mast base 132'. A mast head 136' is fixedly mounted to the top of the mast and is rotatable therewith.

The adjustable boom 124' is pivotally mounted on the mast head 136' for angular up and down movement. The winch cable 129' extends from the winch take-up drum over a pulley (not shown) in the enclosure 136' and out the boom 124' to a pulley (not shown) and thence to a load hook 128. The boom 124' comprises a primary section 124a and a secondary section 124b in a telescopic connection for extending the length of the boom.

Figure 7:
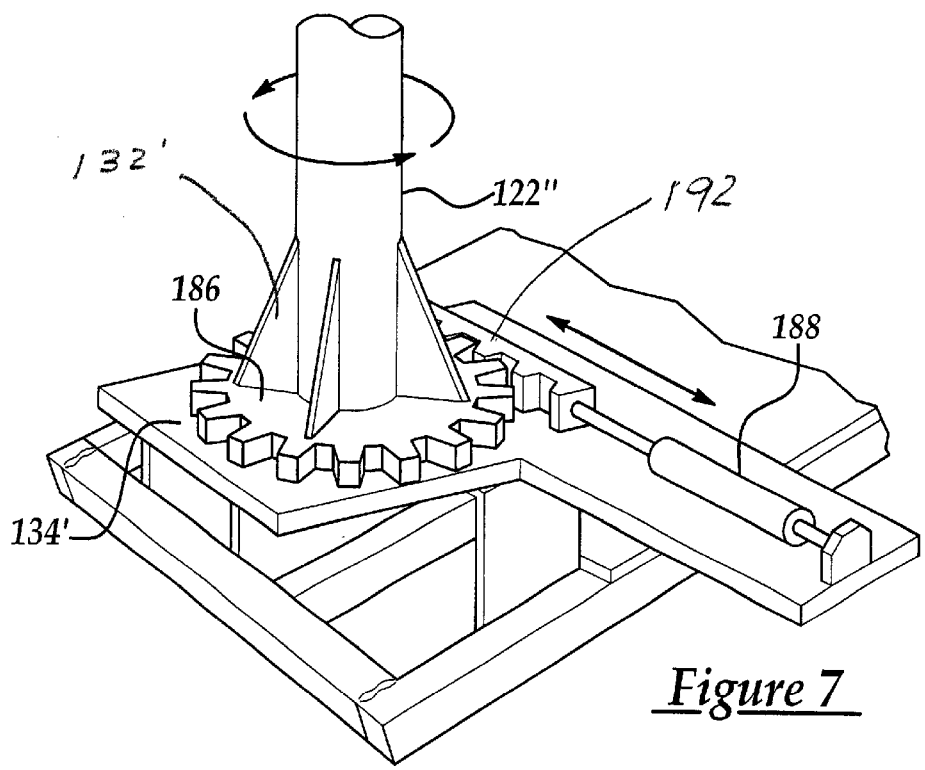
FIG. 7 shows a drive mechanism for rotating the mast.
Figure 8:
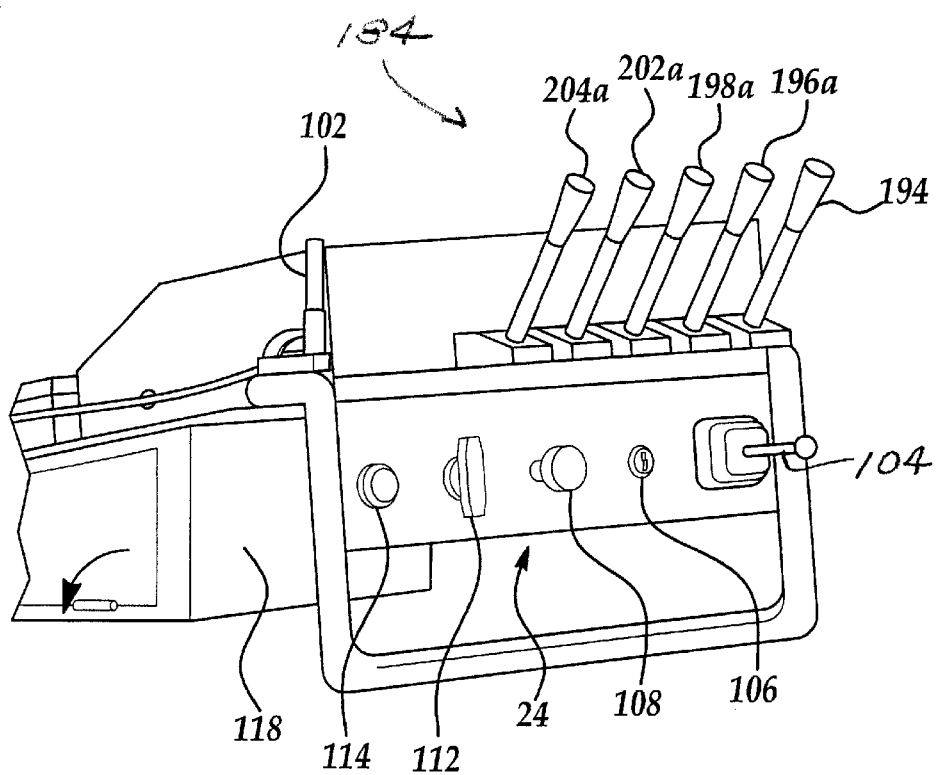
FIG. 8 shows a control panel with hydraulic valves and control levers.

A reversible hydraulic piston actuator 188, as shown in FIG. 7, is provided for rotative positioning of the mast 122". The mast base 132' is mounted, as by welding, on a pinion gear 186 which is supported on a stationary support plate 134' by thrust and journal bearings (not shown). The reversible hydraulic piston actuator 188 is supported on an extension arm of the support plate 134' and is connected with a rack gear 192 which drivingly engages the pinion gear 186 and is slidably mounted on the base plate 134'. The reversible actuator 188 moves the rack gear through a stroke long enough to rotate the mast 122' through one hundred eighty degrees. A mast control valve 194 is operatively connected with the actuator 188 through hydraulic lines (not shown) for rotating the mast to selected positions under manual control.

The boom 124' is provided with a reversible hydraulic piston actuator 196 which is mounted on the mast 122' and operatively connected with the primary boom section 124'. The actuator 196 is energized through a boom angle control valve 196a for angular positioning the boom under manual control. For extending or retracting the boom, a reversible hydraulic piston actuator 198 is mounted on the primary boom section 124a and is operatively connected with the secondary boom section 124b. The actuator 198 is energized through a boom extender control valve 198a for changing the length of the boom under manual control.

Each of the front outriggers 170 is provided with a reversible hydraulic piston actuator 202 (only one shown) which is mounted on the front cross beam 33 of the dolly frame. The actuator 202 is operatively connected to the outrigger 170 for actuation of the outrigger between extended and retracted positions. A single outrigger control valve 202a is operatively connected with both actuators 202 for manual control of extending and retracting the outriggers.

For moving the hinged deck plate 72 between load and dump positions, a reversible hydraulic piston actuator 204 is mounted on a support plate 205 which is mounted, as by welding, to the longitudinal beam 32 of the dolly frame. The actuator 204 is operatively connected to the hinged deck plate 72 for moving it between the loading and dumping positions. The actuator 204 is energized through a dump control valve 204a for moving the deck plate between load and dump under manual control.

An additional modification of the dolly is adapted to provide increased load capacity and vehicle stability. This modification comprises the addition of a second caster wheel and strut (not shown) in a side-by-side arrangement with the caster wheel 42 shown in FIG. 1. The strut of the additional caster wheel is mounted on the opposite side of the longitudinal beam 37 from the caster wheel 42. Alternatively, dual castor wheels can be provided on a single axle which is supported on a single strut.

Figure 9:
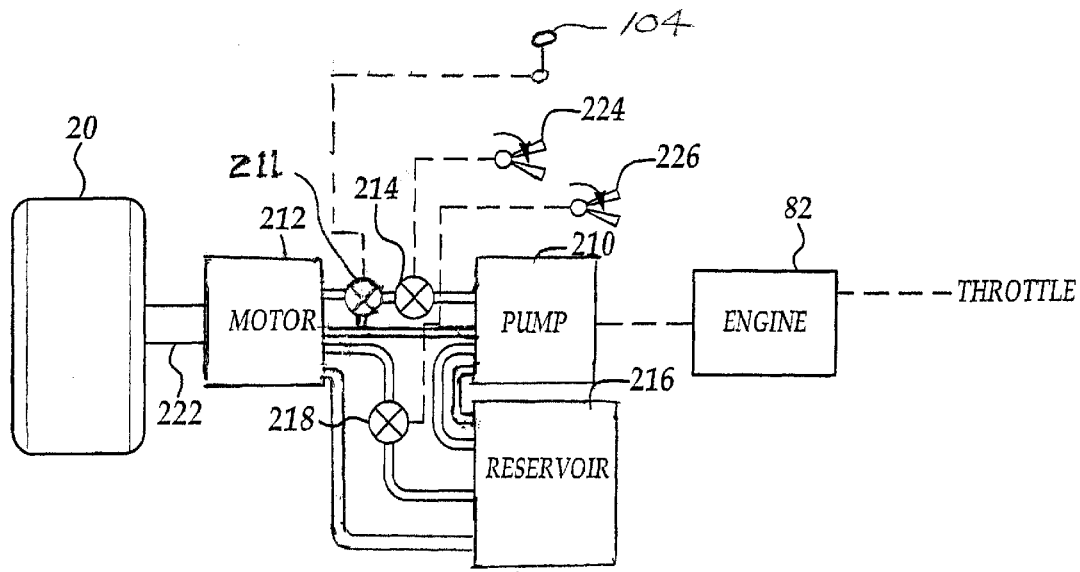
FIG. 9 is a diagram showing a modified powertrain.

A modified power train for the power dolly for this invention is shown in the diagram of FIG. 9. In this modification, a pair of hydraulic traction motors 212, instead of the hydraulic transmission are used to drive the traction wheels 20 of the power dolly. This modified power train comprises engine 82 which drives a hydraulic pump 210. The outlet lines of the pump 210 are connected to the inlets of both hydraulic motors 212 (only one motor is shown) through a flow control valve 214 and a reversing valve 211. Hydraulic fluid is supplied from a reservoir 216 to the inlets of the pump 210 and the fluid is returned from the outlets of the motor 212 to the reservoir through a flow control valve 218. The output shaft 222 of the motor is directly connected with the wheel hub of the traction wheel 20. The traction motors are provided with the reversing valve 211 and control means in a conventional manner so as to provide forward, reverse, and neutral drive selectively by shift control lever 104 under control of the operator. The engine throttle controls the speed of the engine 82 and hence the pump speed and the speed of the traction motors. The speed of the traction motors can be modulated by the flow control valve 214 which is manually actuated by the operator through a lever 224 located on the steering handle adjacent the control panel. The flow control valve 218 is controlled by a lever 226 which is also located on the steering handle. Each of the control levers 224 and 226 is spring biased to a valve-closed position. Accordingly, the valve 224 cuts off the flow of hydraulic fluid to the motor inlet unless the operator manually squeezes the lever to the valve-open position. Similarly, the control lever 226 is spring biased to place the flow control valve 218 in a valve-closed position. In order to energize the traction motor 212, the operator squeezes the control lever 224 with his right hand and squeezes the control lever 226 with his left hand. The motor speed can be changed by adjusting the position of the control lever 224 while holding the control lever 226 in the fully squeezed or depressed position. Braking action may be achieved by simultaneously releasing both control levers 224 and 226 which instantly locks the traction motors against rotation.

Figure 10:
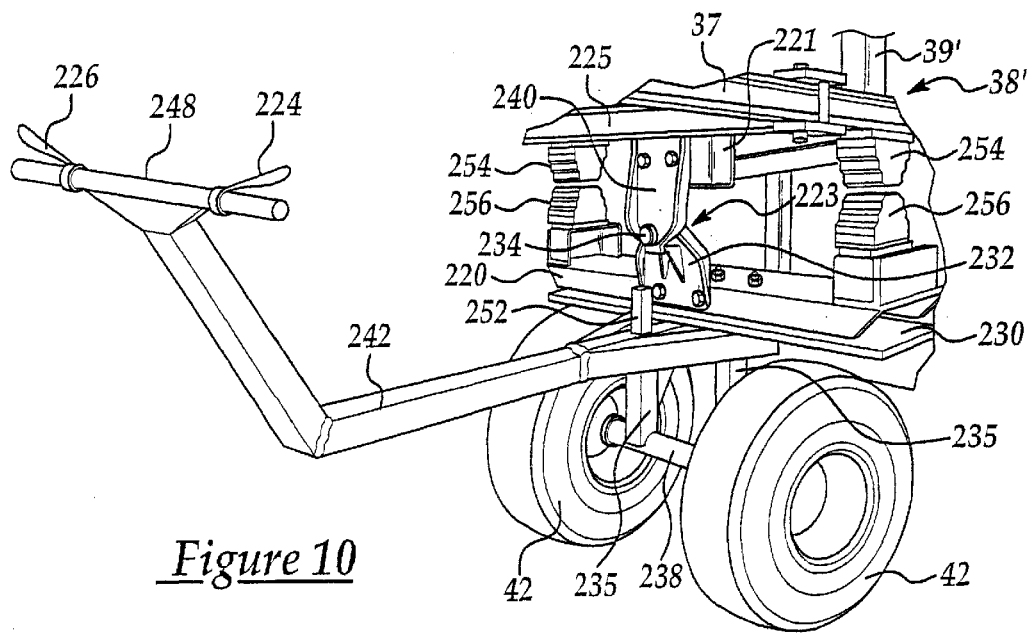
FIGS. 10 and 10A show a modified suspension and steering system.
Figure 10A:
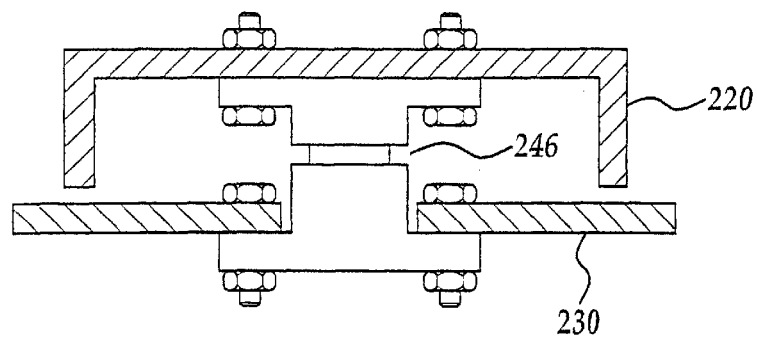

A modified suspension system for the pivot wheels of the dolly is shown in FIGS. 10 and 10A. The suspension to be described makes it easier to steer and maneuver the power dolly when operating in the transport mode, especially on uneven ground and side-hill travel.

The modified suspension system comprises a suspension plate 220 which is supported from the subframe 38' which, as shown in FIG. 5, is mounted to the bottom of the main frame 12. The suspension plate 220 is mounted to a pair of oppositely disposed side rails 37 by means of a cross beam 225. The suspension plate 220 is hung by a pivot joint 223 from the cross beam 225. The pivot joint 223 comprises an upper support plate 240 which is mounted at its upper end to a rectangular bracket 221 which is connected with the cross beam 225. A lower support plate 232 is connected at its upper end by a pivot pin 234 to the lower end of support plate 240. The lower end of the lower support plate 232 is connected to the side of the suspension plate 220. In this arrangement, the suspension plate 220 is supported for rocking motion transversely of the subframe 38' about the longitudinal axis of the pivot pin 234.

The pivot wheels 42 are mounted for rotation about an axle 238 which is supported on a Y-shaped steering beam 242 by a pair of vertical struts 235. A transverse steering plate 230 is pivotally connected to the suspension plate 220 by a pivot shaft 246 as shown in FIG. 10a. A Y-shaped steering beam 242 is fixedly connected at its front end to the steering plate 230. A steering handle 248 is connected with the steering beam 242.

Thus, the pivot wheels are pivotally mounted on the suspension plate 220 and can be turned right and left by the steering handle 248. To prevent over-steering, a limit pin 252 is mounted on the steering beam 242 so that it engages the side of the suspension plate 220 when the steering beam 242 is swung to a limit position in either direction.

In order to limit the rocking motion of the pivot wheels, a pair of rubber springs 254 and 256 are mounted in confronting relationship on the beam 37 and the suspension plate 220, respectively, at the right hand end of the suspension plate 220. Similarly, a pair of rubber springs 254' and 256' are mounted at the left end of the suspension plate 220.

FIGS. 11, 12, 12A, 12B and 13 show a modified front outrigger system for the power dolly. As shown in FIG. 11, a pair of outriggers 260 and 260' are adjustably mounted on the support plate 174 which is mounted on the front end of the main frame 12. The outrigger 260 comprises an outrigger post 262 which is supported on the plate 174 by an adjustment mechanism 264. The adjustment mechanism comprises a post retaining member 266 in the form of a rectangular sleeve which slideably supports the outrigger post 262. The post 262 is provided with a linear array of holes 268 on the upper side and the retaining sleeve 266 is provided with a locking pin 272 which can be inserted and retracted from a selected hole to adjust the effective length of the outrigger post 262.

In the adjusting mechanism 264, the retaining sleeve 266 is rotatably mounted to the support plate 174 through a pair of angular indexing plates 274 and 276. Indexing plate 274 fixably mounted to the support plate 174. Indexing plate 276 is fixably connected with the retaining sleeve 266 by a shaft 275 which extends through the plate 276 and is journalled in the fixed indexing plate 274. A bias spring 277 is disposed between retaining sleeve 266 and indexing plate 276 and urges the plate toward plate 274. The fixed indexing plate 274 is provided with a circumferential array of holes 273 in the surface which confronts the indexing plate 276. Indexing plate 276 is provided with a pair diametrically opposite locking pins 271 at the same diameter as the array of holes 273 in plate 274. The locking pins 271 can be aligned with any selected pair of holes by rotating the post retaining sleeve 266 about the shaft 275. The indexing plate 276 is provided with a handle 278 for retracting the plate 276 from plate 274 to remove the lock pins from the holes in plate 274 and thereby permit angular positioning of the outrigger post 262 relative to the support plate 174.

Outrigger 260' is identical to outrigger 260 except that the adjusting mechanism 264' is spaced from the support plate 174 by a spacer or standoff 282. This arrangement permits the outriggers 262 and 262' to be rotated in different vertical planes so that they do not clash or interfere with one another during angular adjustment of the posts when they are deployed for operation of the dolly in the lift mode or when they are deployed for operation of the dolly in the transport mode.

The front end outrigger arrangement just described is advantageous when operating the dolly in the lift mode for moving an object, such as a rock or log from the ground to the bed of a truck. In this situation, the dolly can be located cross-ways of the truck bed in very close proximity to the rear end of the truck bed by rotating the post of the inner outrigger to an angle at which it reaches under the rear bumper of the truck. In order to facilitate the deployment of the outriggers in the lift mode, a lifting jack 284 is mounted to the front end of the main frame 12. The jack is operated manually to take some of the load off of the traction wheels during deployment of the front outriggers.

CONCLUSION

Although the description of this invention has been given with reference to a particular embodiment, it is not to be construed in a limiting sense. Many variations and modifications within the scope of the invention will now occur to those skilled in the art.

I claim:

1. A power dolly comprising:
    a main frame having a longitudinal axis, a front end and a rear end,
    a powertrain platform mounted on said main frame adjacent said front end thereof,
    a load bed mounted on said main frame and extending longitudinally on said main frame,
    an undercarriage for providing rolling engagement of the dolly with the ground and comprising two traction wheels mounted on said main frame adjacent the front end thereof, and at least one caster wheel adjacent the rear end thereof, mounted on said main frame adjacent the rear end thereof,
    said undercarriage supporting said main frame so it is tilted downward at an angle from rear to front relative to a plane defined by the points of engagement of said traction wheel and pivot wheels with the ground, said angle being in the range of about ten degrees to about thirty degrees,
    a crane including a mast and a boom, said mast being mounted on said main frame adjacent the front end thereof,
    an engine mounted on said platform,
    power transmitting means coupled between said engine and said traction wheels for driving said traction wheels,
    and a manually actuated steering handle for changing the direction of said pivot wheel relative said main frame for steering the dolly.

2. A power dolly as defined in claim 1 wherein:
    said power transmitting mean comprises a hydraulic transmission having an input shaft coupled with said engine and having an output shaft extending transversely of said main frame and being drivingly connected at one end with one of said traction wheels and being drivingly connected at the other end with the other of said traction wheels.

3. A power dolly as defined in claim 1 wherein:
    said power transmitting means comprises a hydraulic pump having an input shaft coupled with said engine, a pair of hydraulic traction motors connected, respectively, with said traction wheels, and said pump being hydraulically connected with each said traction motors for energisation thereof.

4. A power dolly as defined in claim 1 wherein:
    said boom is pivotally mounted on said mast for pivotal rotation about the axis of said mast, and
    said crane includes a power winch having a lifting cable, said winch being mounted adjacent said mast with said cable extending from the end of said boom for connection with a load.

5. A power dolly as defined in claim 4 wherein:
    said power winch is an electric winch,
    and a storage battery supported on said powertrain platform and electrically connected with said electric winch for energisation thereof.

6. A power dolly as defined in claim 4 wherein:
    said power winch is a hydraulic winch, and a hydraulic pump is coupled with said engine, said pump being hydraulically connected with said hydraulic winch for said energisation thereof.

7. A power dolly as defined in claim 6 wherein:
    said boom is pivotally connected with said mast for rotation in a vertical plane and a hydraulic actuator is connected between said boom and said mast for adjusting the rotational position of said boom.

8. A power dolly as defined in claim 7 including a base member for supporting said mast on said main frame, said base member being fixedly connected with said main frame and comprising an upwardly opening socket for removeably holding the lower end of said mast in a telescopically adjustable joint for removal of said mast from said dolly and for adjustment of the height of said mast on said dolly.

9. A power dolly as defined in claim 7 wherein:
    said mast comprises a separate lower section and a separate upper section,
    said upper and lower sections being connected together by an adjustable telescopic joint.

10. A power dolly as defined in claim 1 wherein:
    said boom is mounted for rotation in a horizontal plane relative to said main frame,
    and wherein said dolly includes means for limiting the rotation of said boom to an angular sector which extends rearwardly of said main frame, being no greater than 180 degrees.

11. A power dolly as defined in claim 10 wherein:
    said means for limiting comprises a mast head having a first member fixed to said mast and a second member rotatably mounted on said first member for supporting said boom for rotation in a horizontal plane, a pair of angularly spaced stop elements on one of said members and a stop element on the other said members for limiting the range of rotation of said mast head member.

12. A power dolly as defined in claim 1 including:

a pair of front outriggers pivotally mounted on opposite sides of said main frame at the front end thereof and a pair of rear outriggers pivotally mounted on said opposite sides of said main frame at the rear end thereof.

13. A power dolly as defined in claim 12 wherein said front outriggers comprise;

a first outrigger post adjustably mounted to one end of a transverse support member at the front of said main frame by a first adjustment mechanism, a second outrigger post adjustably mounted to the other end of said transverse support member by a second adjustment mechanism, each of said first and second adjustment mechanisms comprising a post retaining member, said post being slidably supported by said retaining member for extending and retracting said post in a direction laterally and upwardly of said main frame, said post retaining member being rotatably mounted to said support member through an angular indexing means for angular adjustment of said leg for engagement with the ground.

14. A power dolly as defined in claim 13 wherein:

said mechanism comprises a support sleeve and said indexing means comprises a pair of relatively rotatable plates.

15. A power dolly as defined in claim 13 including:

a lifting jack mounted on said support member for engagement with the ground and manually actuable for providing a lifting force on the front of said main frame.

16. A power dolly as defined in claim 1 wherein:

said pivot wheels are mounted on said subframe by a vertical strut, a steering handle connected with said main frame for manual movement thereof in a lateral direction of said main frame on said pivot wheel for controlling the direction of travel of said dolly.

17. A power dolly as defined in claim 1 including a steering plate mounted on a subframe for pivotal motion about a vertical axis, a steering handle connected with said steering plate and adapted for manual actuation in a lateral direction to steer said dolly, said subframe being suspended from said main frame by a pivotal coupling, said pivotal coupling having a pivot axis parallel to the longitudinal axis of said main frame whereby said pivot wheels can undergo rocking motion about said pivot axis to maintain engagement with the ground when traversing a side hill, and a pair of compression springs disposed on opposite sides of said pivot axis for resisting rocking motion of said pivot wheels.

18. A power dolly as defined in claim 1 wherein:

said load bed includes a longitudinally extending bed plate and oppositely disposed side boards, one of said side boards being detachably mounted adjacent said bed plate, said bed plate being hingedly connected on one edge with said main frame, and means for connecting the other edge of said bed plate with said boom for lifting said bed plate to an object from said bed plate with said crane.

19. A power dolly as defined in claim 16 wherein:

said strut is pivotally mounted on said subframe for angular adjustment in the fore and aft direction, and said strut including means for adjusting the length thereof whereby the position of said pivot wheel may be adjusted relative to said traction wheels to facilitate stair climbing.

20. A power dolly as defined in claim 1 including a control panel mounted on the rear end of said main frame, said control panel being provided with an engine throttle handle operably connected with said engine, and a control lever for shifting the powertrain from neutral to forward and reverse drive.

* * * * *